United States Patent [19]

Grant

[11] Patent Number: 4,858,490
[45] Date of Patent: Aug. 22, 1989

[54] TWO MOTOR REDUNDANT DRIVE MECHANISM

[75] Inventor: Richard W. Grant, Manhattan Beach, Calif.

[73] Assignee: Hughes Aircraft Company, Los Angeles, Calif.

[21] Appl. No.: 107,314

[22] Filed: Oct. 13, 1987

[51] Int. Cl.⁴ .................... F16H 37/06; F01B 21/04
[52] U.S. Cl. .................................. 74/661; 74/665 B; 74/665 Q; 74/675; 60/716
[58] Field of Search ............... 74/661, 665 A, 665 B, 74/665 Q, 675, 781 R; 60/716

[56] References Cited

U.S. PATENT DOCUMENTS 3,386,694  6/1968  Boyle ................................. 74/675
3,986,412  10/1976  Farley ................................ 74/661

FOREIGN PATENT DOCUMENTS 0019859  2/1977  Japan ................................. 74/661

OTHER PUBLICATIONS

Musser, The Harmonic Drive, 1960, 2-15, Class 741640.

Primary Examiner—Leslie A. Braun
Assistant Examiner—Douglas Fox
Attorney, Agent, or Firm—Steven M. Mitchell; Mark J. Meltzer; A. W. Karambelas

[57] ABSTRACT

Motors (42,44) each have a pinion driving ring gear (62). Motor (42) is mounted on the platform and motor (44) is mounted on ring gear carrier (56). Rotation of either motor rotates carrier (56), hubs (40) and shaft (30).

18 Claims, 3 Drawing Sheets

TWO MOTOR REDUNDANT DRIVE MECHANISM

FIELD OF THE INVENTION

This invention is directed to a redundant drive mechanism where two motors have an input to an all-spur gear mechanism where either motor can be energized to drive the output shaft.

BACKGROUND OF THE INVENTION

Reliability is achieved by conservative design wherein parts are physically loaded to stresses far below their yield point and wherein duplicate mechanisms are provided for those parts which have the highest failure rates, even with conservative design. In some environments, the weight associated with conservative design is also a negative factor. The sheer cost of the additional material and the machine time involved in handling the additional material is only a starting additional cost. In those systems where the mechanism will be involved in transportation, the additional weight will be a continuing penalty. Whether on highway, rail or flying vehicles, the excess weight of conservative design poses a penalty. The penalty becomes quite large in air flight and space flight. As a result of such penalties, original design must incorporate factors which maximize reliability but minimize weight.

The present two-motor redundant drive mechanism is a low weight mechanism with two redundant drive motors and is configured to provide reliable drive for a number of different mechanical devices. While it is useful in a number of land applications, such as applying the brakes on a railroad train, it is particularly useful in aircraft and space applications. For example, it is useful in controlling the flaps or trim tabs in an aircraft and is capable of raising and lowering the landing gear of the aircraft. In space, it is capable of raising an antenna from a stowed to a deployed position.

SUMMARY OF THE INVENTION

In order to aid in the understanding of this invention, it can be stated in essentially summary form that it is directed to two-motor redundant drive mechanism wherein each motor can individually drive the output shaft by spur gear engagement.

It is, thus, a purpose and advantage of this invention to provide a two-motor redundant drive mechanism which is light of weight, constructed with spur gear engagement for ease of manufacture and elimination of thrust loads, and which can reliably drive an output shaft.

Other purposes and advantages of this invention will become apparent from a study of the following portion of the specification, the claims and the attached drawings.

DESCRIPTION OF THE PREFERRED EMBODIMENTS

Figure 1:
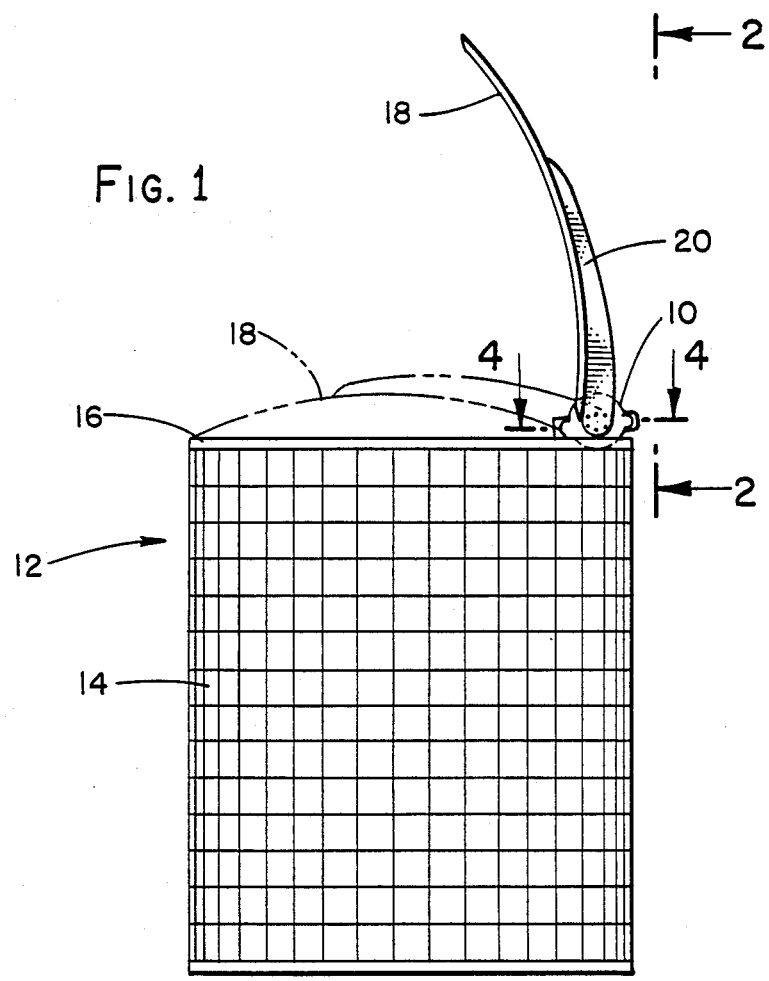
FIG. 1 is a side-elevational view of a satellite, showing one application for the two-motor redundant drive mechanism in with this invention.
Figure 2:
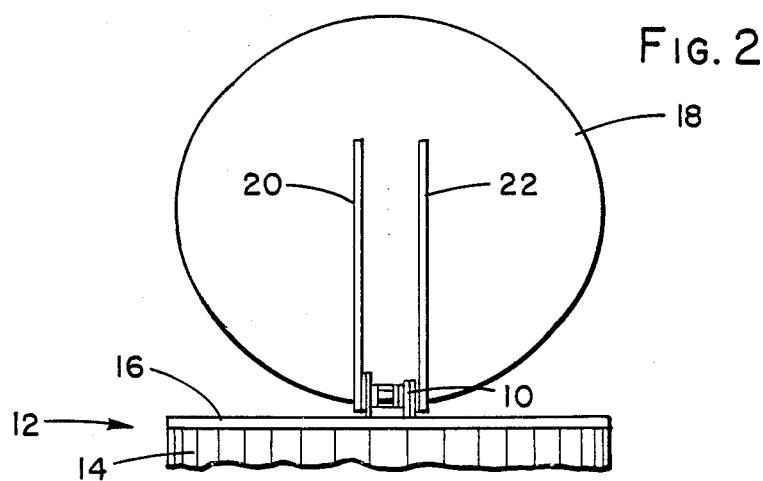
FIG. 2 is an elevational view, as seen generally along line 2—2 of FIG. 1, with parts broken away.

The two-motor redundant drive mechanism of this invention is indicated at 10 in FIGS. 1 and 2. As a particular example of utility, the mechanism 10 is shown in connection with the satellite 12, although it is useful with other devices, as described above. The satellite 12 includes a rotating body 14 which may carry on the surface thereof a plurality of solar cells. In order to provide directional capability, the satellite carries a despun platform 16 which can be rotated with respect to the body 14 so that the despun platform can carry equipment which can point in a desired direction. Such equipment may include an antenna reflector 18 which faces an antenna feed (not shown) on the platform. Antenna 18 is shown in its erected position in full lines in FIGS. 1 and 2 and is shown in its stowed position in dashed lines in FIG. 1. In the stowed position, the antenna 18 forms a compact, easily transportable structure and can be secured in place by various clamps to give it additional vibration-resisting strength. In the deployed position, antenna 18 is directed at the desired target. Ribs 20 and 22 are secured to the back of the antenna and support the antenna in the erect position.

Figure 3:
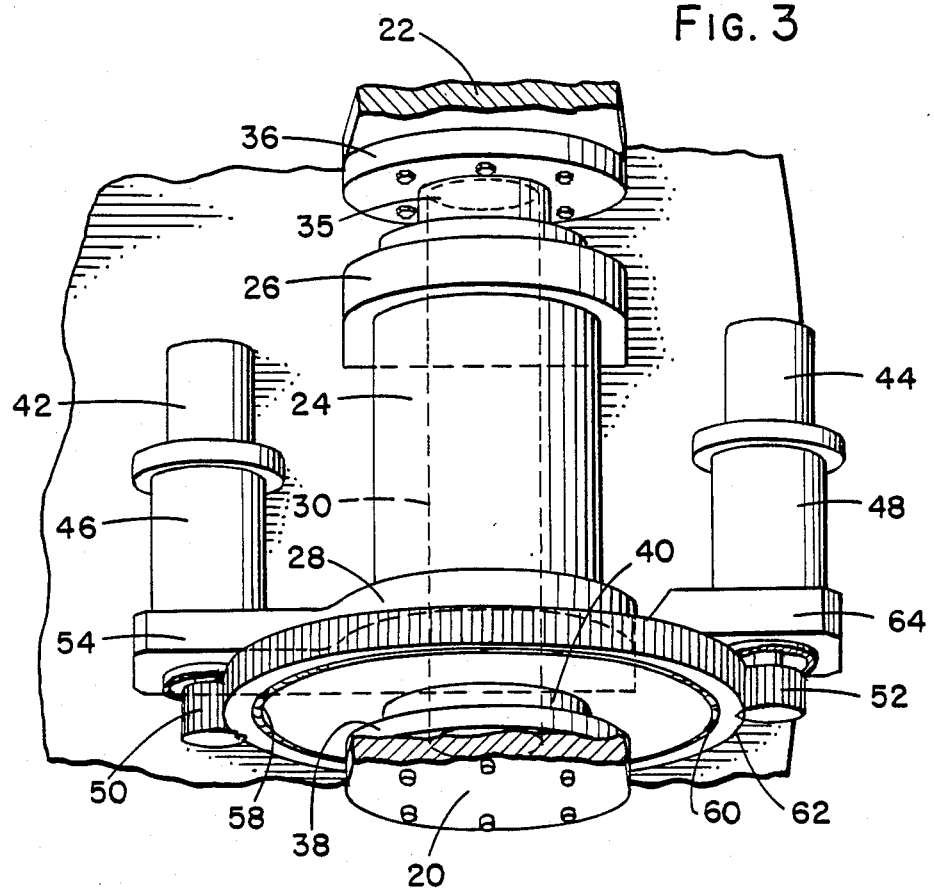
FIG. 3 is a perspective view of the drive mechanism.
Figure 4:
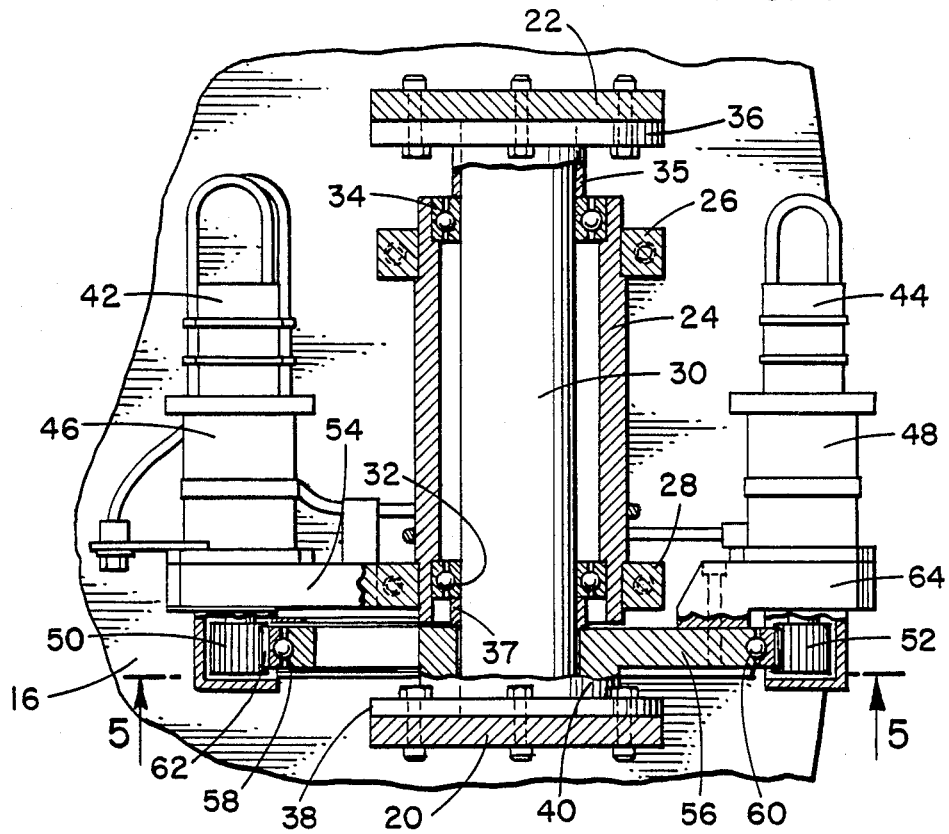
FIG. 4 is an enlarged section through the two-motor redundant drive mechanism of this invention, as seen generally along 4—4 of FIG. 1.

Bearing housing 24, see FIGS. 3 and 4, is in the form of a cylindrical tube and is mounted on feet 26 and 28. These feet are secured to platform 16 by means of bolts which extend up through the platform into the bolt holes shown in dashed lines in FIG. 4. Shaft 30 is the main antenna support shaft of the mechanism and is rotatably mounted within antifriction bearings 32 and 34 within housing 24. Flange 36 is secured on the main shaft 30. Flange 36 engages against tube 35 which engages against bearing 34 to serve as an axial thrust bearing for the shaft 30. Flange 36 also carries bolted thereto the antenna rib 22. On the other end of main shaft 30, flange 38 is carried on hub 40, which is secured on main shaft 30. Tube 37 bears against bearing 32 as a thrust bearing for shaft 30 facing in the opposite axial direction. In this way, main antenna support 30 is constrained radially and axially to minimum play and is permitted only rotational motion about its axis to raise the antenna from stowed to deployed position.

Two motors 42 and 44 are connected to rotate shaft 30 and thus raise the antenna. In the embodiment shown, the motors are preferably step motors so that angular movement can be accurately controlled. The motors respectively carry gear reducer housings 46 and 48 which contain reduction gears which respectively drive spur gear pinions 50 and 52. The reduction gears are of a high enough ratio so they can only be driven from the motor end. Housing 46 is fixed to foot 28 by means of bracket 54.

Ring gear carrier 56 is fixed to and is formed as part of hub 40 and flange 38, and thus rotates therewith. Ring gear carrier 56 is circular on its outer periphery and carries a ball bearing raceway therein. A plurality of balls is positioned around this raceway, and balls 58 and 60 are shown in FIGS. 3 and 4. Ring gear 62 is a circular ring with external spur teeth. Ring gear 62 has a ball raceway on its inner diameter, with its raceway engaged upon the balls 58 and 60, and the additional balls. In this way, ring gear 62 is rotatably mounted on ring gear carrier 56. Spur gear pinions 50 and 52 are in gear-tooth engagement with the spur tooth ring gear 62, as seen in FIGS. 3, 4 and 5.

Figure 5:
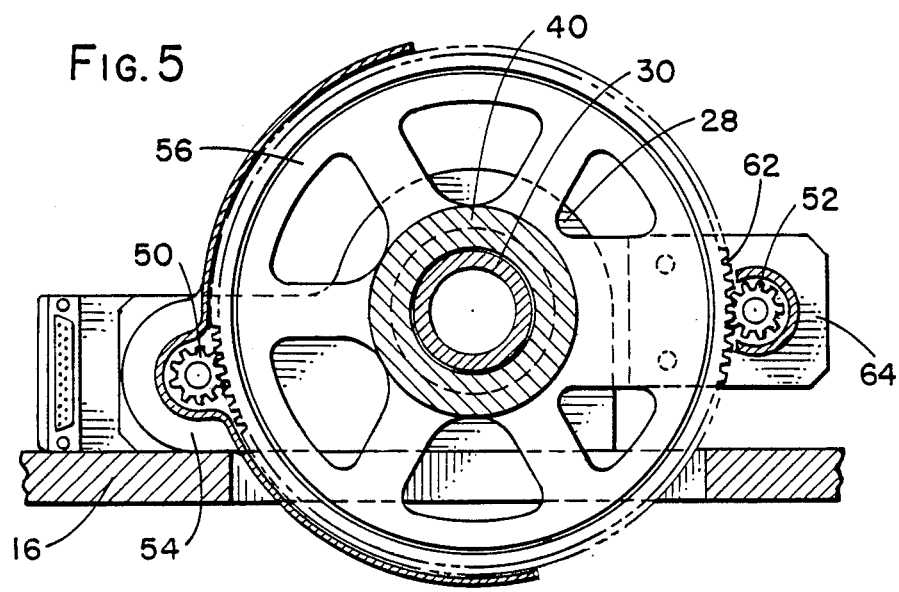
FIG. 5 is a transverse section through the main shaft of the mechanism, as seen generally along the line 5—5 of FIG. 4, with parts broken away.

Gear housing 48 is mounted on bracket 64, and the bracket is in turn mounted on ring gear carrier 56, see FIGS. 4 and 5. Suitable mounting bolt holes are shown in dotted lines in both of those figures. It could be mounted on shaft 30 or something fixed to shaft 30 such as hub 40.

Motors 42 and 44 are any suitable motors and are connected to a control supply. They may be stepper motors, where the speed and total number of revolutions can be readily controlled. The gear reductions in the gear housings are sufficiently large that the gear trains cannot be back-driven. Thus, torque at either pinion will not back-drive the motor. When motor 42 is powered and motor 44 is not, pinion 50 rotates ring gear 62 with respect to the platform and pinion 52 and bracket 64 lock the ring gear to the ring gear carrier 56. Thus, rotation of motor 42 causes rotation of shaft 30.

When there is no power to motor 42, the ring gear 62 is fixed with respect to the platform. Power to motor 44 causes planetary rotation of motor 44 and pinion 52 and causes rotation of ring gear carrier 56 and shaft 30 with respect to the platform. In this way, powering of either motor causes deployment of the antenna. By the use of spur gears, the mechanism 10 is more tolerant of misalignment and changes in center distance, as compared to bevel gear structures. In addition, it must be noted that both thrust loads and radial loads of the antenna on the mechanism are carried directly through the bearings 32 and 34 onto the platform, and only rotational loads are carried by the gearing.

An additional advantage of this structure is seen in the fact that those portions carrying the gear teeth are quite small, and the balance of the mechanism can be made of light alloys, such as aluminum to minimize weight and minimize differential expansion due to temperature changes.

This invention has been described in its presently contemplated best mode, and it clear that it is susceptible to numerous modifications, modes and embodiments within the ability of those skilled in the art and without the exercise of the inventive faculty. Accordingly, the scope of this invention is defined by the scope of the following claims.

What is claimed is:

1. A redundant drive mechanism comprising:
 a platform;
 a shaft rotatably mounted with respect to said platform for rotation about a first axis with respect to said platform;
 a first motor stationarily mounted with respect to said platform, a first pinion, said first motor being connected to drive said first pinion for rotation about a second axis which is substantially parallel to said first axis of said shaft;
 a ring gear carrier mounted on said shaft and rotationally fixed to said shaft;
 a rigid ring gear rotatably mounted on said ring gear carrier for rotation about said first axis of rotation of said shaft, said first pinion being in gear-tooth engagement with said rigid ring gear;
 a second motor, said second motor being mounted on said ring gear carrier, a second pinion, said second pinion being rotatably mounted on said ring gear carrier for planetary motion around said shaft and said first axis, said second pinion being connected to be driven by said second motor and being rotatable on an axis parallel to said axis of rotation of said shaft, said second rigid pinion also being in gear-tooth engagement with said rigid ring gear so that energization of either said first or second motor causes rotation of said shaft with respect to said platform.

2. The mechanism of claim 1 wherein there is a first gear reduction between said first motor and said first pinion and there is a second gear reduction between said second motor and said second pinion so that each of said pinions turns slowly with respect to the speed of rotation of its corresponding motor.

3. The mechanism of claim 2 wherein each of said first and second pinions and said ring gear is a spur gear to eliminate axial loads on said shaft due to pinion torque.

4. The mechanism of claim 1 wherein each of said first and second pinions and said ring gear is a spur gear to eliminate axial loads on said shaft due to pinion torque.

5. The mechanism of claim 1 wherein there is a bearing housing fixedly mounted with respect to said platform and there are first and second bearings mounted in said housing, said shaft being mounted in said first and second bearings for rotation with respect to said platform, said bearings being arranged to resist both radial and axial loads from said shaft onto said bearings.

6. The mechanism of claim 5 wherein said bearings comprise ball bearings, one adjacent each end of said bearing housing, each of said ball bearings having a radial face and an axial face respectively for carrying radial loads and axial loads of said bearing with respect to said housing.

7. The mechanism of claim 6 wherein there is a first gear reduction between said first motor and said first pinion and there is a second gear reduction between said second motor and said second pinion so that each of said pinions turns slowly with respect to the speed of rotation of its corresponding motor.

8. The mechanism of claim 7 wherein each of said first and second pinions and said ring gear is a spur gear to eliminate axial loads on said shaft due to pinion torque.

9. The mechanism of claim 6 wherein each of said first and second pinions and said ring gear is a spur gear to eliminate axial loads on said shaft due to pinion torque.

10. A two-motor redundant drive mechanism comprising:
 a platform, a bearing housing mounted on said platform;
 a shaft rotatably mounted in said bearing housing for rotation about a shaft axis, first mounting means on each end of said shaft exterior to said bearing housing for attachment of members to be moved by rotation of said shaft about said axis, a ring gear carrier fixedly mounted on said shaft between said first mounting means;
 a first motor fixedly mounted with respect to said platform, a first pinion mounted for rotation about a pinion axis parallel to said shaft axis, with irreversible drive means provided between said motor and said first pinion for driving said first pinion without torque loads on said first pinion being able to drive said first motor;
 a rigid ring gear rotatably mounted on said ring gear carrier and in gear-tooth engagement with said first pinion;

a second motor, a second pinion in gear-tooth engagement with said rigid ring gear on a second pinion axis substantially parallel to said shaft axis, with irreversible drive means provided between said second motor and said second pinion so that said second motor can drive said second pinion and torques on said second pinion cannot rotate said second motor, and second mounting means for rotatably mounting said second pinion on said ring gear carrier so that said second pinion rotates in planetary motion around said shaft axis so that rotation of either of said first and second motors rotates said shaft with respect to said platform.

11. The mechanism of claim 10 wherein said first pinion, said second pinion and said ring gear are spur gears to eliminate axial loads on said shaft due to gear tooth engagement.

12. The mechanism of claim 11 wherein said second mounting means for said second pinion comprises a bracket mounted on said ring gear carrier, said bracket carrying said second motor and said second pinion.

13. The mechanism of claim 10 wherein there are bearings rotatably supporting said shaft in said bearing housing and said bearings comprise first and second antifriction bearings adjacent the ends of said bearing housing, said first and second antifriction bearings each having a radical face for supporting radial loads and an axial face for supporting axial loads of said shaft with respect to said housing.

14. The mechanism of claim 13 wherein there is a flange mounted on each end of said shaft and there is a rib mounted on each said flange, said ribs being support ribs for an antenna.

15. A two-motor redundant drive mechanism comprising:
a platform, a bearing housing mounted on said platform;
a shaft rotatably mounted in said bearing housing for rotation about a shaft axis, first mounting means on each end of said shaft exterior to said bearing housing for attachment of members to be moved by rotation of said shaft about said axis, a ring gear carrier fixedly mounted on said shaft between said first mounting means;
a first motor fixedly mounted with respect to said platform, a first pinion mounted for rotation about a pinion axis parallel to said shaft axis, with irreversible drive means comprising a first gear reduction between said first motor and its first pinion for driving said first pinion without torque loads on said first pinion being able to drive said first motor;
a rigid ring gear rotatably mounted on said ring gear carrier and in gear-tooth engagement with said first pinion;
a second motor, a second pinion in gear-tooth engagement with said rigid ring gear on said second pinion axis substantially parallel to said shaft axis, with irreversible drive means comprising a second gear reduction between said second motor and its second pinion so that said second motor can drive said second pinion and torques on said second pinion cannot rotate said second motor, and second mounting means for rotatably mounting said second pinion on said ring gear carrier so that said second pinion rotates in planetary motion around said shaft axis so that rotation of either of said first and second motors rotates said shaft with respect to said platform.

16. The mechanism of claim 15 wherein said first pinion, said second pinion and said ring gear are spur gears to eliminate axial loads on said shaft due to gear tooth engagement.

17. The mechanism of claim 16 wherein said second mounting means for said second pinion comprises a bracket mounted on said ring gear carrier, said bracket carrying said second motor and said second pinion.

18. The mechanism of claim 17 wherein there are bearings rotatably supporting said shaft in said bearing housing and said bearings comprise first and second antifriction bearings adjacent the ends of said bearing housing, said first and second antifriction bearings each having a radial face for supporting radial loads and an axial face for supporting axial loads of said shaft with respect to said housing.

* * * * *